(12) United States Patent  (10) Patent No.: US 8,150,613 B2
Engelhard  (45) Date of Patent: Apr. 3, 2012

(54) TECHNIQUE FOR DETECTING SHIFTED CARGO

(75) Inventor: Lars Engelhard, Nuremberg (DE)

(73) Assignee: Elektrobit Automotive GmbH, Erlangen (DE)

( * ) Notice: Subject to any disclaimer, the term of this patent is extended or adjusted under 35 U.S.C. 154(b) by 686 days.

(21) Appl. No.: 12/277,785

(22) Filed: Nov. 25, 2008

(65) Prior Publication Data

US 2009/0138191 A1 May 28, 2009

(30) Foreign Application Priority Data

Nov. 27, 2007 (EP) ..................................... 07022959

(51) Int. Cl.
*G06F 17/10* (2006.01)
(52) U.S. Cl. ......... 701/124; 340/440; 340/429; 180/290
(58) Field of Classification Search .................. 340/440, 340/429, 689; 180/290; 701/124
See application file for complete search history.

(56) References Cited

U.S. PATENT DOCUMENTS

| 5,742,914 A * | 4/1998 | Hagenbuch ..................... 701/35 |
| 6,313,331 B1 | 11/2001 | Cavell et al. |
| 6,313,742 B1 | 11/2001 | Larson |
| 6,363,331 B1 * | 3/2002 | Kyrtsos ......................... 702/175 |
| 6,452,487 B1 | 9/2002 | Krupinski |
| 6,938,716 B1 * | 9/2005 | Eull .............................. 180/282 |
| 7,339,460 B2 * | 3/2008 | Lane et al. .................... 340/438 |
| 2007/0273493 A1 * | 11/2007 | Reichow et al. .............. 340/440 |

FOREIGN PATENT DOCUMENTS

DE 10 2004 060 809 A1 6/2006
* cited by examiner

*Primary Examiner* — Mark Hellner
(74) *Attorney, Agent, or Firm* — Westerman, Hattori, Daniels & Adrian, LLP

(57) ABSTRACT

A technique for determining shifted cargo on a vehicle is described. A method realization of this technique comprises the steps of acquiring data from a positional sensor and determining a change in a balance of loads upon wheels of the vehicle. Shifted cargo is determined if the change in load balance does not correspond to the positional data. Furthermore, a device and system suited for carrying out the method are provided.

19 Claims, 5 Drawing Sheets

TECHNIQUE FOR DETECTING SHIFTED CARGO

TECHNICAL FIELD

The invention relates to vehicle safety. More particularly, the invention relates to detecting shifted cargo on a vehicle.

BACKGROUND

A motor vehicle exposes a handling performance that is dependent on the extent and manner in which the vehicle is loaded with cargo. Cargo includes any kind of mass the vehicle transports, such as passengers, animals, solid items or an amount of liquid. Cargo influences the vehicle behaviour especially during phases of accelerating, braking and travelling along a curved path.

In addition to the influence of the extra mass of the cargo, the position of the cargo with respect to the vehicle may also impact the vehicle's handling performance. For instance, a vehicle that bears more load on its right-hand side may be inclined to turn more easily to this side but show difficulties turning to the other hand side. A cargo that is positioned near a driven axle may help preventing the driven wheels to skid during driveaway; placed close to a steering axle, the cargo may decrease the steerability of the vehicle.

While the effect of cargo on a vehicle's handling performance may be small in a passenger car, it can be considerable in a truck or bus because there is more opportunity to place a cargo in different positions in a cargo bay or cabin. Moreover, the weight of the cargo may easily exceed the weight of an unloaded truck.

Even careful initial loading sometimes does not prevent a situation of imbalance to occur, for instance if later on a part of the cargo is removed, while another part remains on the vehicle. Such imbalance may cause lopsided deterioration e.g. of tires and alter the vehicle's handling performance especially under critical conditions like sharp turning or hard braking, so that a driver may be unable to fully anticipate the vehicle's handling performance. Besides, the imbalance may lead to increased gasoline consumption due to an increased drag of those tires that are overly loaded.

If cargo is not sufficiently secured within the cargo bay, forces that act upon the vehicle and cargo while driving may cause the cargo to topple over, drop down or slidingly shift position. Of course, if a plurality of pieces of cargo is transported, a shifting may concern each transported piece in a different way and extent, and may change the balance of the vehicle in a complex fashion. Such dynamic changes may pass unnoticed by the driver and may therefore contribute to unpredictable and dangerous changes in the vehicle's handling performance.

With the advent of on-board electronic stability control systems, a number of techniques were developed that address the problem of vehicles with uneven load distribution, some of them attempting to compensate for the effects of cargo mass or cargo position on the vehicle by intervention into the suspension, propulsion, braking or steering system.

According to U.S. Pat. No. 6,313,742 B1, a method and apparatus for detecting compromised vehicle wheel and tire operating characteristics comprises detection of off-centre loads. To this end, sensor signals for rotational speeds of several vehicle wheels are evaluated. Both turns and imbalances may be detected through a side to side variation in wheel speeds. Turns are distinguished from imbalances by observing if the variation is only temporal.

U.S. Pat. No. 6,313,331 B1 proposes a method of monitoring the weight distribution on a vehicle and includes measuring characteristic values of axles, comparing them with expected values and potentially sending a warning signal to a driver of the vehicle.

U.S. Pat. No. 6,452,487 B1 discloses a technique for warning of a tip-over condition in a motor vehicle. Sensors on a left side and a right side of the vehicle pick up fractional cargo loads for the respective sides. Based on these values, a load ratio is determined that is compared with a threshold value and an alarm is raised on exceeding the threshold value.

DE 10 2004 060809 A1 discloses a method for determining an actual position of a centre of gravity of a motor vehicle based on spring travels on springs on at least one axle.

It is an object of the invention to provide a technique that quickly and reliably identifies shifted cargo on a moving vehicle.

SUMMARY

The object is solved by a method for detecting shifted cargo transported by a vehicle, comprising the steps of acquiring data from a positional sensor, determining, for a set of wheels of the vehicle, a change in a balance of loads upon the wheels, and determining shifted cargo if the change in load balance does not correspond to the data acquired from the positional sensor. Depending on the total number of wheels of the vehicle, the set may comprise 2, 3, 4 or more wheels. Some of the wheels may be mounted on the same axle, on different lateral sides of the vehicle or on the same side.

Each wheel load may be determined using any technique known in the art, such as via determining an inflation pressure of a tire of each wheel, a deflection of a spring located between a wheel and a vehicle chassis or a pressure inside a pressure-based (e.g. liquid or gaseous) wheel suspension. Determining a wheel load balance may also comprise processing wheel rotational data for each wheel in the set, based on the fact that a change in tire pressure will result in a changed effective circumference of the tire, as is known in the art. A wheel load balance may for instance be represented by an indication of a position of a centre of gravity of the vehicle with respect to the vehicle, e.g. with respect to the vehicle's geometrical centre. The wheel load balance may also comprise an indication of an absolute wheel load.

The change in the balance of loads upon the wheels may be determined by analysing a set of wheel loads for a plurality of points in time. The method may thus be carried out by performing the steps of determining, for a first point in time, a first load balance (B1) and a first motional state (M1) of the vehicle, determining, for a second point in time, a second load balance (B2) and a second motional state (M2) of the vehicle, and determining shifted cargo if a first relationship between any two elements of a group comprising the first motional state (M1), the second motional state (M2), the first load balance (B1) and the second load balance (B2) does not correspond to a second relationship between the other two elements of said group.

Examples for relationships indicative of shifted cargo (using the "≠" sign for "does not correspond to") comprise:

$$\frac{B1}{B2} \neq \frac{M1}{M2}; \quad (1)$$

$$\frac{B1}{M1} \neq \frac{B2}{M2}; \quad (2)$$

$$\frac{B1}{M2} \neq \frac{B2}{M1}; \quad (3)$$

$$\frac{B2}{B1} \neq \frac{M2}{M1}; \quad (4)$$

$$\frac{M1}{B1} \neq \frac{M2}{B2}; \text{ and} \quad (5)$$

$$\frac{M2}{B1} \neq \frac{M1}{B2}. \quad (6)$$

Note that in the above notation, examples (4) through (6) are reciprocal versions of examples (1) through (3).

As an illustration of example (1), shifted cargo may be determined if the relationship between the first (B1) and second (B2) wheel load balances does not correspond to the relationship between the first (M1) and second (M2) motional states of the vehicle. Should, for instance, the first (M1) and second (M2) motional states of the vehicle be identical, any relationship between the first (B1) and second (B2) wheel load balances that differs from identity may indicate shifted cargo. Correspondingly, should the first (B1) and second (B2) wheel load balance be identical, any relationship between the first (M1) and second (M2) motional state that differs from identity may indicate shifted cargo.

The motional state may be determined on the basis of at least one of a plurality of vehicle positions over time, a plurality of vehicle speeds over time and a vehicle position on a roadway the vehicle is travelling on. For example, a vehicle acceleration may be determined as a time derivative of a vehicle speed. A vehicle speed, in turn, may be a time derivative of a vehicle position. To this ends, the positional sensor may determine either vehicle positions or vehicle speeds or both. Naturally, the two above differentiation operations may be performed in one step. The motional state may also be determined on the basis of a vehicle speed and a vehicle position on a roadway the vehicle is travelling on.

The motional state may additionally, or in the alternative, be indicative of a vehicle acceleration. A short-term component of the vehicle's motion as from an unevenness in the road may be removed from a long-term component of the vehicle's motion as from the vehicle travelling along a roadway. The acceleration may be given with respect to a reference system that is fixed to the ground the vehicle is travelling on, like for instance a global geodetic system such as WGS-84. It may also be given with respect to a vehicle-fixed reference system. Transposing between these two reference systems may be performed on the basis of map data. The acceleration may be a superposition of accelerations along different axes or a component along one axis of a multi-dimensional acceleration force. For instance, the acceleration may be given with respect to a three-dimensional vehicle-fixed Cartesian system, and only a lateral component to the vehicle may be contemplated by the method.

The acceleration may be determined on the basis of map data. The map data may relate the determined vehicle position with a roadway the vehicle is travelling on. To resolve ambiguities, like a vehicle position on a roadway intersection, position information of other points in time may be used. The curvature of the roadway at the position of the vehicle upon the roadway may be determined. The vehicle acceleration may be determined by relating the vehicle speed with the curvature of the road at the position the vehicle is situated at. Vehicle speed and position data may be based on data from the positional sensor and be comprised in the vehicle's motional data.

For the above mentioned group, based on three elements of the group, an expected value for the fourth element of that group may be determined and compared to an actual value of that element. For example, an expected value for a second wheel load balance may be determined on the basis of example (4) above and assuming a correspondence of equality ("$\neq$" standing for "is not equal to"):

$$B2_{expected} \neq \frac{B1 \cdot M2}{M1}.$$

$B2_{expected}$ can then be compared with an actual value $B2_{actual}$ (that may have been measured). If a difference between the two values for B2 is larger than a predetermined threshold value, shifted cargo may be determined.

The balance of wheel loads may be determined on the basis of tire pressures associated with each of the wheels in the set. The tire pressures may be determined individually for each tire in the set. This may involve determining tire temperatures in order to compensate for heating effects. It may also involve determining at least one of an ambient temperature, an ambient air pressure and a value for infrared radiation, as from sunlight, absorbed by a tire.

The method may comprise storing data indicative of at least one of motional states of the vehicle and a set of load balances in a history database. Based on such historical data, long-term observations may be performed or data from one point in time may be compared to data from more than one other point in time. Examples comprise comparison with data averaged over a plurality of points in time. Slow or momentary influences to the wheel load balance may therefore be accounted for. One example for a slow effect is a tank of gasoline on board of the vehicle that is emptied over time. A momentary effect may be caused by a change of driving lanes. Additionally, sudden changes that may be indicative of a shift of cargo may be detected by analysing the speed of changes in the past.

The method may comprise initiating a warning or status signal to a driver of the vehicle if shifted cargo was determined. Such a warning may be of acoustic (e.g. a warning sound or a spoken message), optic (e.g. a warning light, a graphic or text message) or haptic (e.g. a vibration induced into a steering wheel) nature or any combination thereof. The warning may also be noticeable to other persons on board of the vehicle, like a person overlooking a cargo bay or a passenger attendant.

The method may be carried out by a computer program product with program code portions when the computer program product is run on a processing unit. Exemplary processing units comprise navigation systems removably or firmly installed on board of the vehicle. In one scenario, the processing unit carries out additional tasks on board of the vehicle, such as vehicle stability control or acceleration management.

The computer program product may be stored on a computer-readable medium. Computer-readable media comprise optical (CD, DVD), magnetic (floppy disk, hard disk, bubble memory) and solid state (RAM, ROM, PROM, EPROM, EEPROM, Flash) memory.

The object is also solved by a device for detecting shifted cargo transported by a vehicle, the device comprising a positional sensor adapted to acquire positional data, an interface adapted to receive data capable of indicating, for a set of wheels of the vehicle, a balance of loads upon the wheels, and a processor adapted to detect shifted cargo by determining a lacking correspondence between a change in load balance and the data acquired from the positional sensor.

The positional sensor may be a satellite navigation receiver. The data obtained from the positional sensor may be augmented by wheel rotation information of the vehicle or data derived from other sensors such as a gyroskope or steeringwheel angle sensor.

The interface may be adapted for wireless reception of data. In one example, the interface receives data from a plurality of wheel load sensors that each wirelessly transmit data indicative of a wheel load. In a variation of this example, data from a plurality of sensors is transmitted over one single wireless link. Exemplary wireless protocols include Bluetooth™, Zigbee, IEEE 802.11 and Wimax.

The device may also comprise a map database containing roadway information for vehicle positions (e.g. for one country, for several countries or for a continent). Positional information for past points in time may be used in a heuristic to determine a specific roadway the vehicle is travelling on in case of ambiguities, e.g. a vehicle position where two roadways intersect.

The device may further comprise a history database for storing data indicative of at least one of motional states of the vehicle and a set of load balances. The history database may be a ring buffer, overwriting oldest entries with newest data. Data indicative of a motional state may comprise e.g. a position, a direction of movement, a vehicle speed and wheel rotation information. Additional data that may be stored in the history database comprises a measurement date and time and a curvature of a roadway or vehicle path. The curvature of the roadway may be determined by relating a vehicle position with a map database comprising information on a plurality of roadways. The map database may comprise roadway information at least in a vicinity of the vehicle position.

The device may be a satellite navigation device, and it may rely on measurements from satellites belonging to at least one of the GPS, GLONASS or GALILEO satellite navigation systems. The device may also make use of augmentation data, such as provided by TMC, TMC PLUS, EGNOS or differential satellite measurements. Based on satellite measurements, a position may be determined based on signal runtime measurements and/or phase measurements. A vehicle speed may be determined based on Doppler measurements of satellite signals, or by a history of measured positions over time.

The object is also solved by a system for detecting shifted cargo transported by a vehicle, comprising a device according to one of the variants described herein, a set of sensors, each sensor being associated with a tire of the vehicle, for determining a set of tire pressures, and at least one transmitter for transmitting the determined tire pressures to the device interface. As described above, the sensors may use any technique known in the art for determining individual wheel loads or a wheel load balance. Data transmission may comprise a wireless link. It may also comprise a cable- or fibre-optic link. The link may for instance be a CAN bus on board of the vehicle.

The system may also comprise a user interface for exchanging information with a user. The user interface may comprise for instance visual elements like a display screen, LEDs or lamps, acoustic elements like a microphone or a speaker, haptic elements like a keypad or a vibration unit attached to a steering wheel and combined units like a touch screen (combining visual output with haptic input).

BRIEF DESCRIPTION OF THE DRAWINGS

Embodiments will now be discussed in greater detail with reference to the drawings, in which.

DETAILED DESCRIPTION OF EMBODIMENTS

Figure 1:
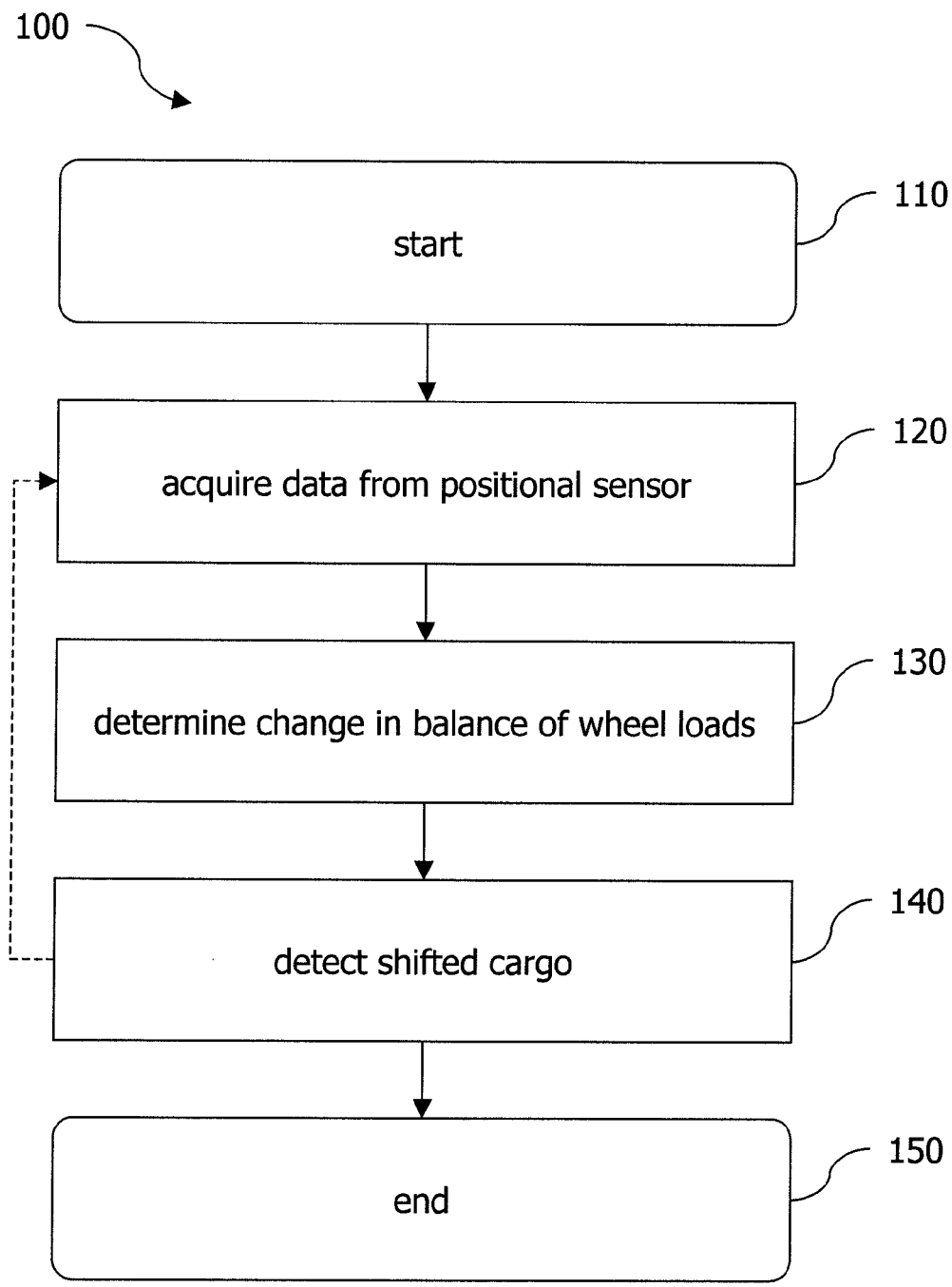
FIG. 1 shows a sequence of events in a first method embodiment.

FIG. 1 shows a general flow diagram 100 of a method for detecting shifted cargo transported by a vehicle according to one embodiment. The method starts in step 110. In step 120, data is acquired from a positional sensor. In step 130, a change in a balance of wheel loads is determined. To this end, a set of wheel loads for some or each of the wheels of the vehicle and a first wheel load balance may be determined. Furthermore, a second wheel load balance at another point in time and a change between the first and second wheel load balances may be determined.

Based upon the data determined in steps 120 and 130, it is determined in step 140, whether cargo transported by the vehicle has shifted. If, for example, the first and second wheel load balances are identical (the change in wheel load being zero), a shifted cargo may be determined if the data acquired from the positional sensor indicates that there is a lack of correspondence between motional states associated with the first and second wheel load balances. Each motional state may comprise an indication of the vehicle's position and/or motion. The method terminates in step 150. In one embodiment, steps 120 through 140 are repeated while the vehicle is in use, as indicated by the broken line.

Figure 2:
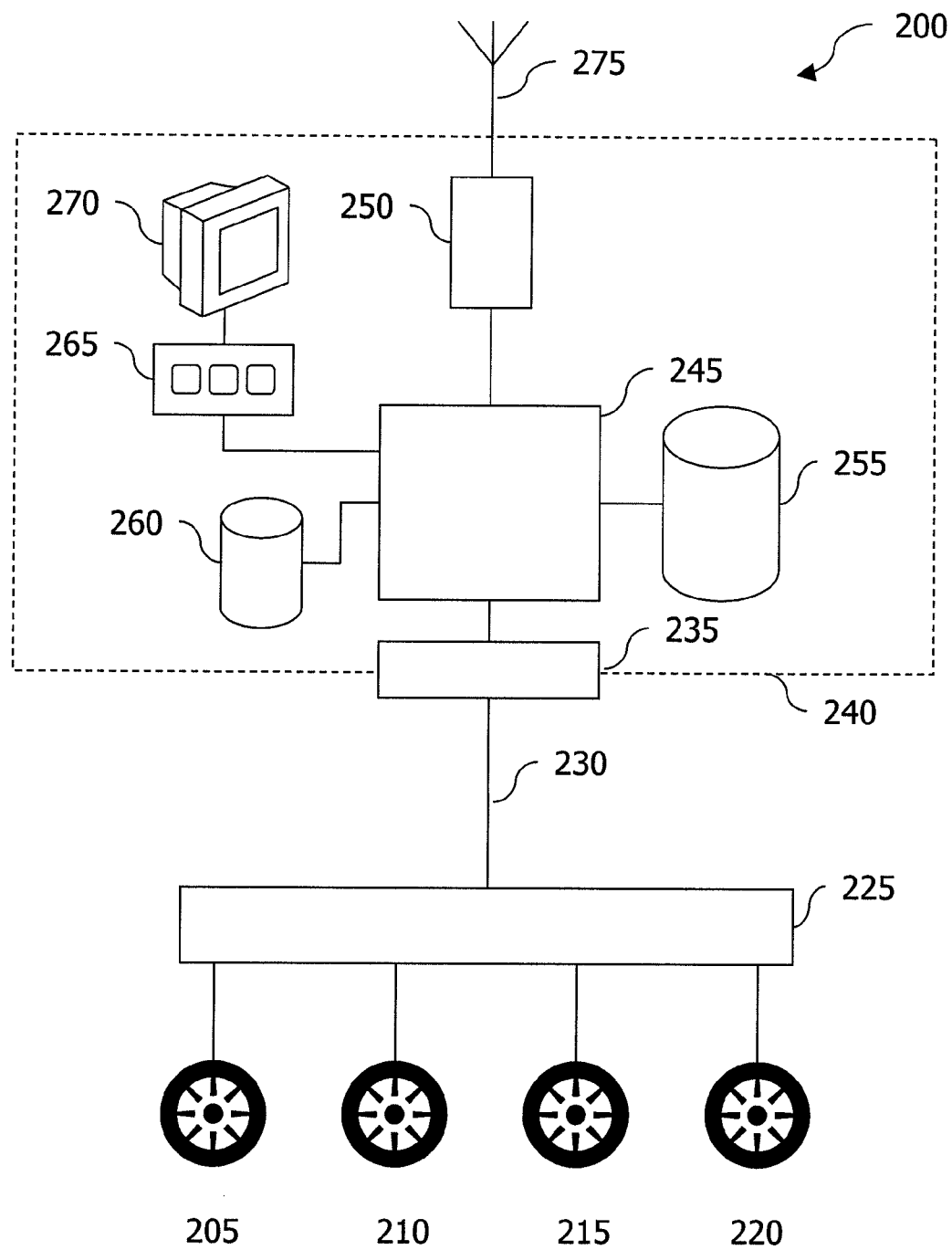
FIG. 2 shows system and device embodiments.

FIG. 2 shows a block diagram of one embodiment of a system 200 for detecting shifted cargo transported by a vehicle. System 200 may be used to carry out the method embodiment illustrated in FIG. 1.

The vehicle carrying system 200 comprises four wheels 205, 210, 215 and 220. Each wheel comprises a gas-filled tire, the filling pressure of which is determined using sensors (not shown) associated with each of the wheels 205-220. Integrated tire pressure sensors are known in the art and described for example in German utility model DE 29 623 466 U1. Some of the embodiments described therein may replace a standard tire valve and may be mounted without taking the tire from the rim. Other tire pressure sensors known in the art are fixed to the rim on the inside of the tire and cannot be accessed without removing the tire from the rim. In one embodiment, valve-mounted tire pressure sensors with wireless transmission are used, regardless of whether or not there are additional tire pressure sensors mounted inside the tire.

The pressure values determined for the wheels 205-220 are collected by a unit 225 and transmitted via a transmission link 230 to an interface 235 of the satellite navigation device 240. The satellite navigation device 240 comprises a processing unit 245, which is connected to the interface 235. The processing unit 245 is connected to a satellite navigation receiver 250, a map database 255, a history database 260 and a user interface comprising a keypad 265 and a display 270. Finally, the satellite navigation receiver 250 is connected to the satellite antenna 275, which may be external to the satellite navigation device 240, as depicted, or housed inside the device 240.

A compensation for effects of tire temperature and/or air pressure and -temperature outside the tires of wheels 205-220 may be performed; to this ends, additional temperature and/or pressure sensors may be provided. Such sensors (not shown in FIG. 2) may be connected to collection unit 225, to the sensors for each of the tires 205-220, or to processing unit 245.

The unit 225 and the interface 235 are both adapted to the kind of transmission link 230 employed. In one embodiment, the transmission link 230 comprises a cable or fiber optics connection and the interface 235 and the unit 225 are both adapted to communicate using electrical signals or light waves, respectively. In another embodiment, the transmission link 230 comprises a wireless path and both the unit 225 and the interface 235 are adapted to communicate using electromagnetic waves. In either case, one single transmission link 230 or a plurality of parallel transmission links 230 may be used. In a variation to the example illustrated in FIG. 2, the collection unit 225 is omitted and the sensor signals are transmitted directly to the interface 235 of the satellite navigation device 240.

In one embodiment, the tire sensors (both pressure and temperature) may broadcast determined data on a periodic basis. While the vehicle is at a standstill, the tire sensors may stop broadcasting data and enter a low-power mode (sleep). When the vehicle starts moving again, the sensors may wake up from the low-power mode and take up periodic transmission of data. Power modes may be controlled by commands received by the sensors. Also, initiation of data transmission may be controlled by commands received by the sensors. Both commands may be transmitted by processing unit 245. The data transmitted by a sensor may include an ID that is unique for all sensors to permit an identification. The sensor IDs may be car-dependent. In one embodiment, the tire sensors transmit data to more than one receiver, at least one of them being part of the discussed system. Specifically, the tire sensors may provide data to a unit that determines loss of tire pressure and in parallel this conversation may be received by the satellite navigation device 240 via its interface 235.

Inside the satellite navigation device 240, satellite navigation receiver 250 receives from the antenna 275 signals from a plurality of space vehicles that are part of a global navigation system, such as GPS, GLONASS or GALILEO. In one embodiment, the satellite navigation receiver 250 and the satellite antenna 275 are integrated inside the satellite navigation device 240. Such an integrated receiver may for example be the SirfStar™ III integrated navigation circuit.

Processing unit 245 acquires positional data from satellite navigation receiver 250. Such positional information may comprise a three-dimensional position of the satellite antenna 275 (and therefore of the vehicle), with respect to planet earth. Example reference systems for positions comprise WGS-84 (as used by GPS) and PZ-90 (as used by GLONASS). Position notation may for instance be given in latitude/longitude/height or in a Cartesian system.

Additionally or alternatively, motion data may be provided by the satellite navigation receiver 250. This may be done by taking a time derivative of a vehicle position to obtain a vehicle speed. Another way for determining motion data is to use Doppler measurements for the received satellites. Using this well known procedure, the satellite navigation receiver 250 may determine a speed vector of satellite antenna 275 (and therefore of the vehicle) without determining two or more positions. In one variant, satellite navigation receiver 250 transmits uncombined (raw) satellite measurements to the processing unit 245, which performs the discussed determinations.

Using the acquired positional data from satellite navigation receiver 250, processing unit 245 may look up roadway information for each determined position in the map database 255. Using any arbitrary known heuristic, the processing unit 245 determines the vehicle's position in relationship to a roadway the vehicle is traveling on. The history database 260 may be used to store information for a number of points in time. Stored positional data may later on be used, for instance, to resolve ambiguities when relating a position to a plurality of roadways from the map database 255. Also, data indicative of a wheel load balance and other information can be stored inside the history database 260 to enable long-term evaluation of, for instance, a relationship between a set of tire pressures and a corresponding vehicle motion.

The display 270 and the keypad 265 may be supplemented by an acoustic interface (not shown) for acoustic interaction with a user. The keypad 265 may be used for a user to input control commands and information like a driving destination. The display 270 is used for outputting information like a representation of a current position on a graphical representation of a map of the vehicle's surroundings. For route guidance to a destination, a suggestion for a vehicle maneuver may be presented to the driver using the acoustic interface and/or the display 270.

Figure 3:
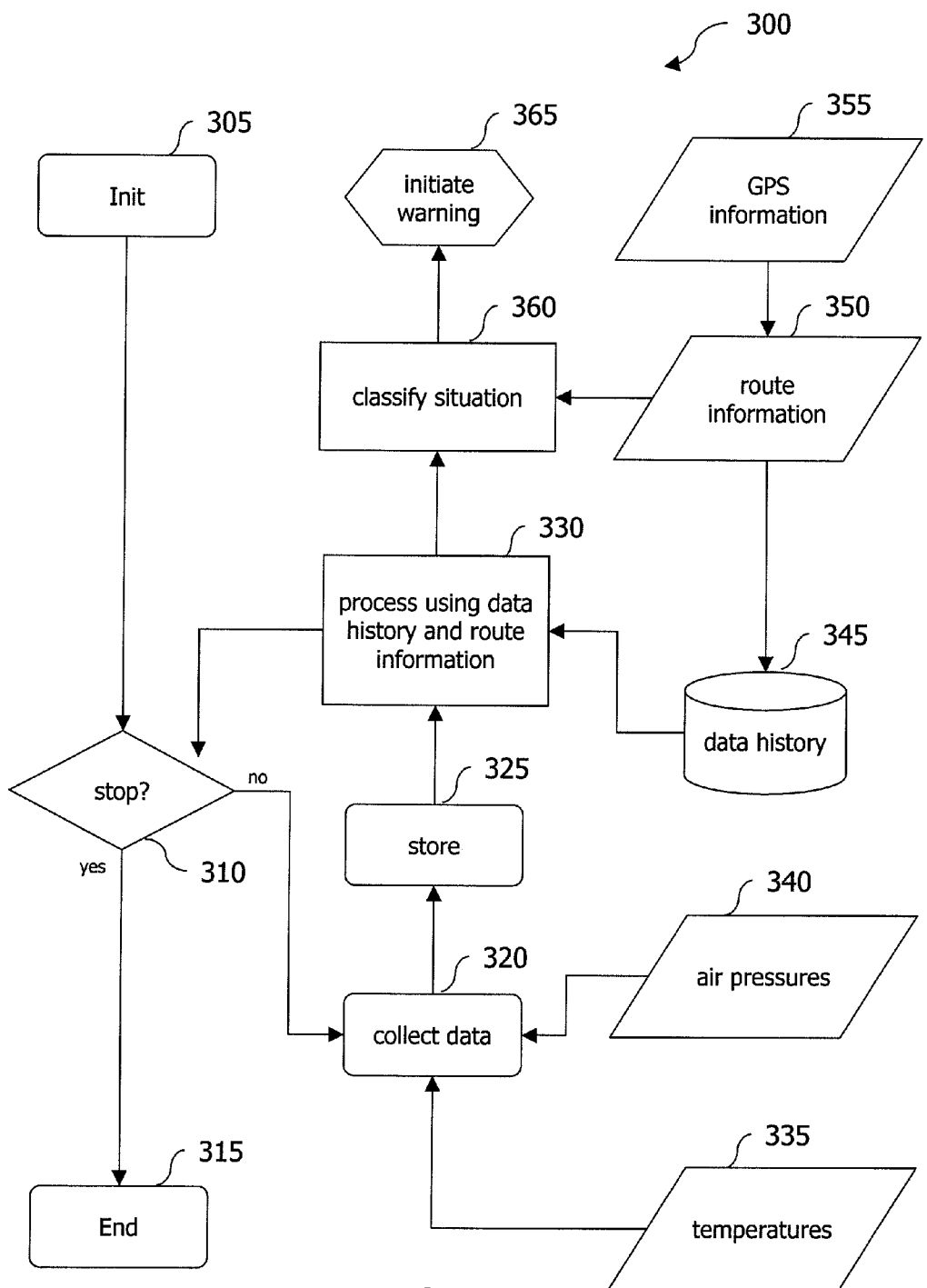
FIG. 3 shows a flow diagram of another method embodiment.

FIG. 3 shows a flow diagram 300 of a method according to one embodiment that may be carried out by the system of FIG. 2 or any other suitably configured system.

The method starts in a step 305, in which an initialization of components is performed. A successive determination step 310 controls termination of the method. Only if a request to stop the method is registered, the method will proceed to a step 315 and end. If no stop request is registered, the method will loop over a data collecting step 320, a storing step 325 and a processing step 330 and back to the termination step 310.

Data for the data collecting step 320 is drawn from temperature sensors and tire pressure sensor in steps 335 and 340, respectively. The data thus collected in the collecting step 320 is stored in a storing step 325. A processing step 330 draws additional information from a data history 345, which is fed from route information 350 being generated on the basis of GPS information 355. At the processing step 330, the method forks into two threads and a first thread loops back to termination step 310, while a second thread proceeds to a classification step 360, where a situation of the vehicle is classified on the basis of the processed information from processing step 260 and the route information 350. In classification step 360, shifted cargo is determined if the change in load balance does not correspond to the data acquired from the positional sensor. If it is determined in the classification step 360 that a warning concerning a shifted cargo is to be output, the warning is output in the warning step 365. Otherwise, the second thread terminates at classification step 360.

The classification of the vehicle situation in classification step 360 may be part of processing step 330, in which case a forking into two threads may not be required. In case a warning is to be output in warning step 365, the method may loop back to termination step 310 after completing the warning step 365, or it may terminate in warning step 365. Warning step 365 may comprise a timer-based end of an alarm. It may also comprise an opportunity for a driver of the vehicle to turn off the alarm. Such action may or may not re-initiate the method, so that the new situation is accepted as a balanced vehicle to permit further determination of shifted cargo. Termination of the method may be done through a driver requesting so, a signal from the vehicle, like a switched off ignition, or an internal determination, like a failure of a sensor as 205-220 or 250 over a period longer than a predetermined time. Execution of the method may also be inhibited while the vehicle is at standstill. Inhibition may or may not concern the gathering of positional information.

In one embodiment, positional information is stored in the data history 345, while wheel load balance data is stored in step 325. This is due to the fact that the quality of positional data (like position and speed of the vehicle or determination of a roadway the vehicle is travelling on) can substantially be improved by processing a number of data sets acquired from the positional sensor 250. Augmentation may be done for instance by averaging positions or speeds, carrying out advanced position determination algorithms (e.g. resolving integer ambiguities for phase measurements) or relating received data with augmentation data that may be available only with some delay.

Wheel load balance data, on the other hand, may not require or enable such augmentation, so that in one embodiment, only two wheel load balances need to be determined and to be related with two sets of motional data, which are determined on the basis of a large number of position determinations. In a different embodiment, wheel load balance data may be stored in a second database, which may or may not be identical with the history database 345.

To give an illustrative example of the operation of the methods and system described above, FIGS. 4a-4d show a vehicle 400 in four different situations during the vehicle's course along a bent roadway 410. Each of the FIGS. 4a-4d corresponds to a different situation along the course, wherein a sequence of events starts at FIG. 4a and terminates at FIG. 4d. Corresponding items carry identical reference numerals, suffixed by a letter (a-d) indicating one of FIGS. 4a-4d. The suffix is not included where reference is generally made to an item in all of FIGS. 4a-4d.

It is assumed that the vehicle 400 is traveling at an essentially constant speed over ground and transporting piece of a cargo 420. A centre of gravity 430 of the vehicle 400 indicates the sum of a gravitational force and a centrifugal force acting upon the vehicle. The location of the centre of gravity 430 of the vehicle 400 corresponds to a balance of wheel loads of the vehicle. Such a wheel load balance may be determined using the system 200 in FIG. 2. In the following discussion, only lateral forces will be of concern. It should, however, be clear that the operation principle of the embodiment can be used for longitudinal and transversal forces as well as any combination of these forces.

In FIG. 4a, vehicle 400a is traveling along a straight line into a curved section of the roadway 410. In FIG. 4b, vehicle 400b starts turning to its right-hand side to follow the curved section of the roadway 410. FIG. 4c shows the vehicle 400c further through the curved section of the roadway 410 and still turning. Finally, FIG. 4d shows vehicle 400d at the end of the curved section of the roadway 410, traveling along a straight line again.

The system 200, when installed on board of the vehicle 400, may be used to determine the progression of the roadway 410 by determining a position of the vehicle 400 and relating it with map information stored in the map database 255. Alternatively, the actual course of the vehicle 400 may be determined using the system 200 to determine a number of positions of the vehicle 400 over time.

In FIG. 4a, the transported cargo 420a and the centre of gravity 430a of the vehicle are both located on a longitudinal axis 440a of the vehicle. As the vehicle 400 is not turning, no centrifugal forces influence the lateral location of the centre of gravity 430a and as the cargo 420a is not positioned to either lateral side of the vehicle, its gravitational force does not either influence the centre of gravity 430a laterally.

In FIG. 4b, vehicle 400b starts turning to its right-hand side, which generates centrifugal forces towards the outside of the curve (i.e. to the left-hand side of the vehicle). These forces act upon the vehicle 400b, including the cargo 420b. The vehicle's centre of gravity 430b is moved away from the longitudinal axis 440b towards the left-hand side of the vehicle 400b, while the transported cargo 420b still rests in its original position with respect to the vehicle 400.

In FIG. 4c, vehicle 400c is still turning. Transported cargo 420c has yielded to the centrifugal forces and has shifted its position towards the left-hand side of the vehicle. As cargo 420c now causes a disturbance in the balance of vehicle 400c towards its left-hand side, and centrifugal forces are still acting upon the vehicle 400c, the centre of gravity 430c of the vehicle 400c has moved still further away from the longitudinal axis 440c to the left-hand side of the vehicle 400c.

In FIG. 4d, vehicle 400d exits the curved section of the roadway 410 and travels along a straight line again. Centrifugal forces are no longer acting upon the vehicle 400d and the transported cargo 420d remains in the position it has assumed in FIG. 4c. The centre of gravity 430d of the vehicle 400d has shifted back to a position close to the longitudinal axis 440d of vehicle 400d due to the now lacking centrifugal forces, but it has not reached a position as in FIG. 4a because the shifted cargo 420d still causes a lateral force on the vehicle 400d.

At this point, a shift of cargo 420 may be determined by comparing a first situation illustrated in FIG. 4a and a second situation illustrated in FIG. 4d with the help of one of the relationships given above, e.g. (2):

$$\frac{B1}{B2} \neq \frac{M1}{M2}.$$

The cargo 420 is thus determined to have shifted its position with respect to the vehicle 400 if the relationship between the first wheel load balance (B1) and the second wheel load balance (B2) does not correspond to the relationship between the first (M1) and second (M2) motional data derived from the positional sensor 250. M1 and M2 describe corresponding motional states of the vehicle 400, i.e. travelling along a straight line. Therefore, the relationship between M1 and M2 will fail to correspond to the relationship between B1 and B2 if, and only if, B1 and B2 do not correspond to one another. The position of the centre of gravity 430a with respect to the vehicle 400a is different from the position of the centre of gravity 430d with respect to the vehicle 400d. As each wheel load balance (B1, B2) corresponds to the respective position of the centre of gravity 400a, 400d, B1 and B2 do not correspond to one another. Therefore, their relationship does not correspond to the relationship between M1 and M1. From this lack of correspondence, a shifted cargo 420d may be determined.

Figure 4:
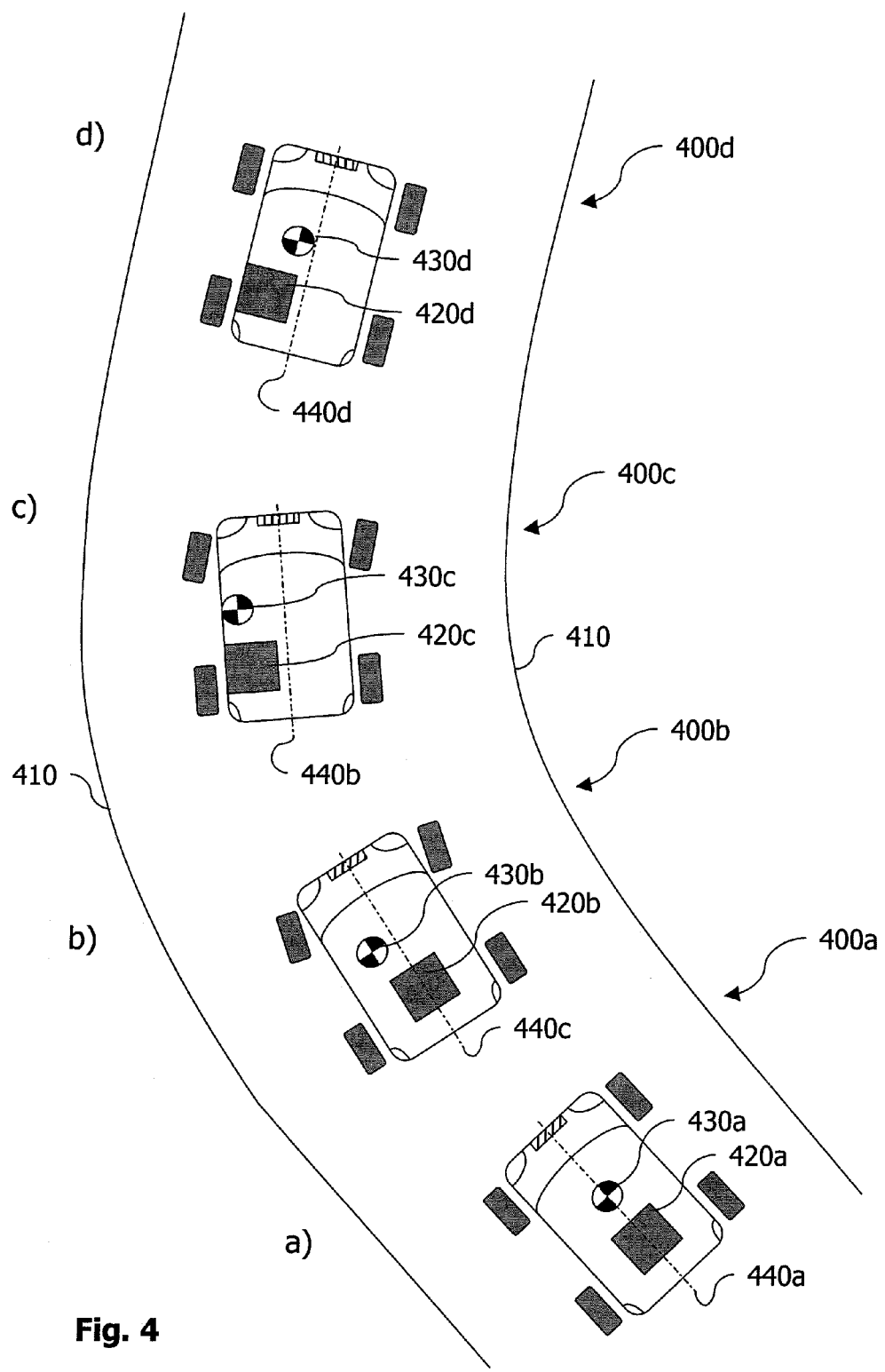
FIG. 4a-d shows four successive situations of a vehicle travelling along a bent roadway.
Figure 5:
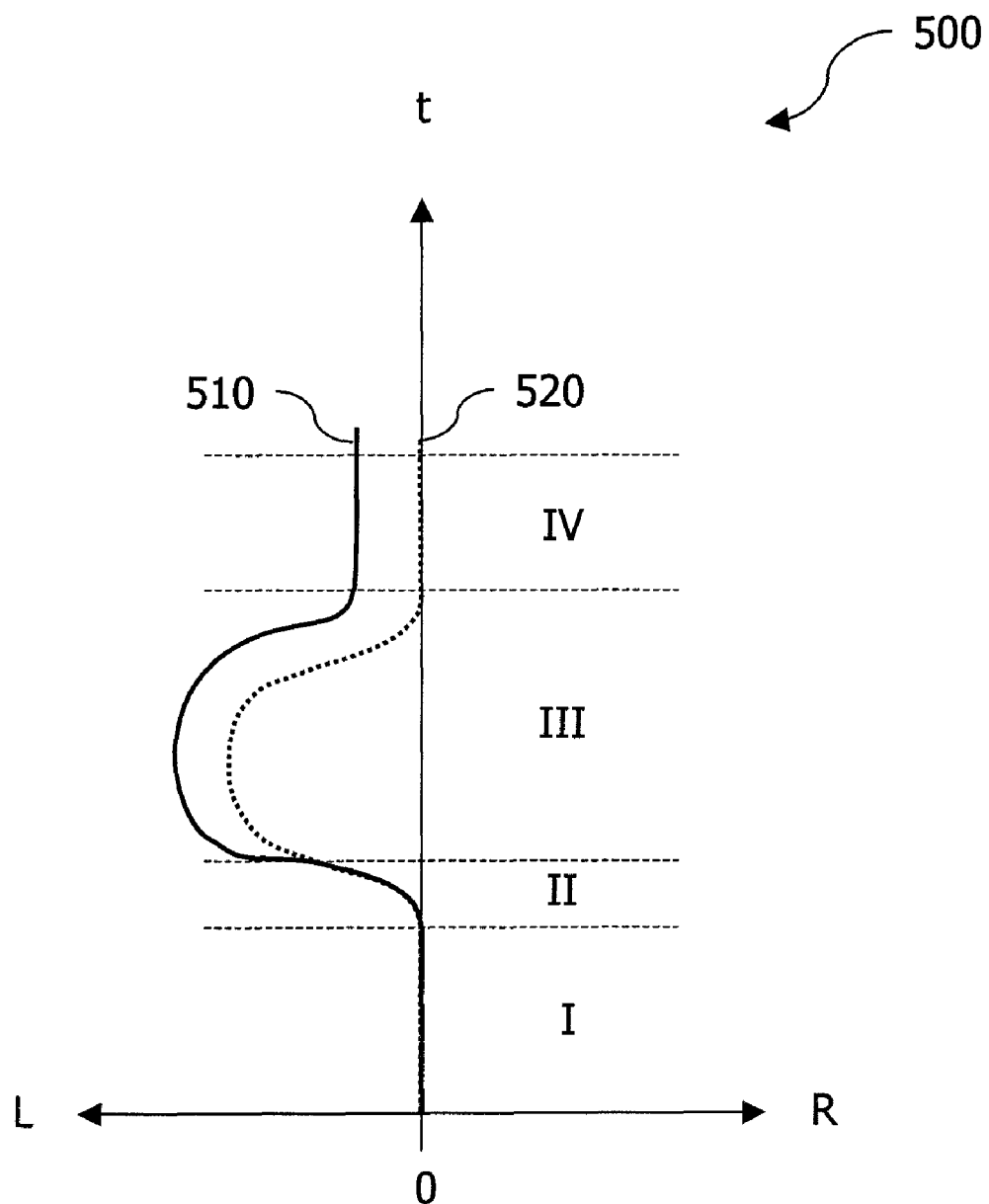
FIG. 5 shows an illustration of gradients of forces acting upon the travelling vehicle of FIGS. 4a-d.

FIG. 5 shows graph 500, illustrating gradients of forces acting upon the vehicle 400 of FIGS. 4a-d. A centrifugal force 510, represented by a dotted line, is caused by the vehicle 400 cruising along the roadway 410. A lateral variation 520 of vehicle wheel loads is represented by a straight line. A vertical axis of graph 500 represents a time and a horizontal axis represents a lateral direction, labeled "L" for the left-hand side of the vehicle 400 and "R" for its right-hand side. Along its vertical axis, graph 500 carries indications for sections I through IV in time, corresponding to the situations illustrated in FIGS. 4a through 4d, respectively. As in FIG. 3, it is assumed that vehicle 400 is in a motion of essentially constant speed over ground and transporting a cargo 420, which is initially loaded in such a way that the lateral wheel load variation 520 is zero.

It is crucial to tell apart the influences of centrifugal forces from influences of shifted cargo upon the wheel load balance. In one embodiment, the centrifugal force 510 is determined on the basis of positional data that is related with map data. Positional information is acquired from a satellite navigation receiver as shown in FIG. 2, and on the basis of this information, the position of vehicle 400 and its speed over ground is computed for the same point in time. The position of vehicle 400 is looked up in a map database, which returns information on a roadway 410 the vehicle 400 is traveling on. The roadway information is then used to determine a degree of curvature of the roadway 410 at the position of the vehicle 400. Considering the speed of the vehicle 400, a magnitude and a direction of the centrifugal force 520 upon the vehicle 400 can be determined. A lateral wheel load variation due to shifted cargo 420 may then be determined by subtracting the determined centrifugal influence from a determined lateral wheel load variation.

In a variation of this embodiment, data of one point in time is checked for correspondence with data of a different point in time, e.g. data stored in a history database 255. Should, for example, for one point in time a lateral wheel load variation of magnitude X be determined while traveling along a straight line (the curvature of the travel path being determined using a GPS receiver), and for a different point in time a different wheel load variation of magnitude Y be determined while also traveling along a straight line, a cargo shift between those two points in time may be determined. In a generalization, this scheme is applicable for other situations than traveling along a straight line as well. For instance, a relationship between a wheel load variation and a centrifugal force (as determined on the basis of positional information related with map data) may be constant for a given vehicle 400 unless a mass attached to the vehicle shifts its position with respect to the vehicle, i.e. a transported cargo shifts. As those of skill in the art will appreciate, a number of different relationships can be used to determine a variation in wheel load balance that is caused by a shifted cargo.

Again with reference to FIG. 4, in a section I, corresponding to FIG. 4a, the centrifugal force 510 acting upon the vehicle 400a is zero as the vehicle 400 travels along a straight line; the lateral wheel load variation 520 is also zero as the vehicle 400a is initially in balance.

In section II, corresponding to FIG. 4b, the centrifugal force 510 and the lateral wheel load variation 520 rise uniformly towards the left-hand side of the vehicle 400. The rise in centrifugal force 510 is caused by the vehicle 400b starting to turn to its right-hand side in the curved section of the roadway 410. The lateral wheel load variation 520 follows this very course, because the cargo 420b is resting in its initial position with respect to vehicle 400b and does not contribute to the lateral wheel load variation 520.

In section III, corresponding to FIG. 4c, the magnitude of the lateral wheel load variation 520 to the left-hand side of the vehicle 400c exceeds the magnitude of the centrifugal force 510. Starting about halfway through section III, the wheel load variation 520 maintains a constant offset to the left-hand side of vehicle 400c with respect to the centrifugal force 510. Vehicle 400c is completing its course through the curved section of the roadway 410 and cargo 420c has yielded to the centrifugal force 510 acting upon it and shifted its position towards the left-hand side of the vehicle 400c.

In section IV, corresponding to FIG. 4d, the centrifugal force 510 has returned back to zero, indicating that vehicle 400d is traveling along a straight line again. The lateral wheel load variation 520, in contrast, still shows its offset towards the left-hand side of the vehicle with respect to the centrifugal force 510, corresponding to the shifted cargo 420d.

The difference between the centrifugal force 510 and the lateral wheel load variation 520 relates to the effect of shifted cargo inside the vehicle. Using a simplistic embodiment, a cargo shift is determined by relating wheel load balances of vehicle positions on straight portions of the roadway 410, wherein the straight portions are identified on the basis of position data. In this case, shifted cargo can be determined at the beginning of phase IV, which is a lot earlier than can be done with systems that perform long-time observation of averaged wheel load balance data. Using a more sophisticated embodiment, as described above, which relates different motional states (or positional data) of the vehicle, shifted cargo can be determined as early as during phase III, when the shifting occurs. Clearly, a driver of vehicle 400, who is informed of a shifted cargo even before the vehicle's course through the curved section of the roadway 410 is completed, can best take action to sustain the vehicle's safety.

In the depicted embodiment, the vehicle 400 starts off with a lateral load variation 520 of zero. As those of skill in the art will appreciate, in case the vehicle 400a is loaded asymmetrically, this offset may be determined and compensated for during carrying out the described technique, so that a determination of shifted cargo is no different from the above described case. The same technique can be used if, in an initial state, values for the absolute wheel loads do not indicate a balanced vehicle. Compensation may comprise a human aboard vehicle 400 indicating a "normal" situation of the vehicle, e.g. after loading, at standstill or during cruise along a straight line, on a level portion of ground. He may do this for instance by pressing a button. The described technique is not only usable for forces in a lateral direction of the vehicle, but can also comprise forces in a longitudinal direction. In this case, acceleration and/or braking forces would be superimposed on a variation in gravitational forces due to a shifted cargo to form a longitudinal wheel load variation, and the technique could be used to tell the difference between the two influences. A combination of wheel load variations in more than one direction is also within the scope of the embodiment.

The embodiments disclosed herein are illustrative and are given only by way of example. The scope of the invention is not to be limited thereby but only by the scope of the appended claims.

The invention claimed is:

1. A method for detecting shifted cargo transported by a vehicle, comprising the steps of:
    acquiring data from a positional sensor;
    for a set of wheels of the vehicle, determining a change in a balance of loads upon the wheels; and
    determining shifted cargo if the change in load balance does not correspond to the data acquired from the positional sensor.

2. The method according to claim 1, further comprising the steps of:
    determining, for a first point in time, a first load balance and a first motional state of the vehicle based on the data acquired from the positional sensor;
    determining, for a second point in time, a second load balance and a second motional state of the vehicle based on the data acquired from the positional sensor; and
    determining shifted cargo if a first relationship between any two elements of a group comprising the first motional state, the second motional state, the first load balance and the second load balance does not correspond to a second relationship between the other two elements of said group.

3. The method according to claim 2, wherein the motional state is determined on the basis of at least one of one of a plurality of vehicle positions over time, a plurality of vehicle speeds over time and a vehicle position on a roadway the vehicle is travelling on.

4. The method according to claim 2, wherein the motional state is indicative of a vehicle acceleration.

5. The method according to claim 4, wherein the acceleration is determined on the basis of map data.

6. The method according to claim 2, comprising the step of determining, based on three elements of the group, an expected value for the fourth element and comparing said value to an actual value of the fourth element.

7. The method according to claim 1, wherein the balance of wheel loads is determined on the basis of tire pressures associated with each of the wheels in the set.

8. The method according to claim 1, further comprising the step of storing data indicative of at least one of motional states of the vehicle and a set of load balances in a history database.

9. The method according to claim 1, further comprising the step of initiating a warning or status signal to a driver of the vehicle if shifted cargo was determined.

10. A computer program product with program code portions for carrying out the method according to claim 1 when the computer program product is run on a processing unit.

11. The computer program product according to claim 10, stored on a computer-readable medium.

12. A device for detecting shifted cargo transported by a vehicle, the device comprising:
   a positional sensor adapted to acquire positional data;
   an interface adapted to receive data capable of indicating, for a set of wheels of the vehicle, a balance of loads upon the wheels; and
   a processor adapted to detect shifted cargo by determining a lacking correspondence between a change in load balance and the data acquired from the positional sensor.

13. The device according to claim 12, wherein the positional sensor is a satellite navigation receiver.

14. The device according to claim 12, wherein the interface is adapted for wireless reception of data.

15. The device according to claim 12, further comprising a map database containing roadway information for a position of the vehicle.

16. The device according to claim 12, further comprising a mechanism for initiating a warning to a driver of the vehicle.

17. The device according to claim 12, further comprising a history database for storing data indicative of at least one of motional states of the vehicle and a set of load balances.

18. The device according to claim 12, where the device is a personal navigation device.

19. A system for detecting shifted cargo transported by a vehicle, comprising:
   a device according to claim 12;
   a set of sensors, each sensor being associated with a tire of the vehicle, for determining a set of tire pressures; and
   at least one transmitter for transmitting the determined tire pressures to the interface of the device.

* * * * *